United States Patent
Yeo

(10) Patent No.: US 7,407,911 B2
(45) Date of Patent: Aug. 5, 2008

(54) METHOD OF PREPARING A DOUBLE LAYERED, PALLADIUM-ONLY THREE-WAY CATALYST

(75) Inventor: Gwon Koo Yeo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 978 days.

(21) Appl. No.: 10/862,147

(22) Filed: Jun. 4, 2004

(65) Prior Publication Data

US 2004/0223897 A1 Nov. 11, 2004

(30) Foreign Application Priority Data

Jun. 4, 2003 (KR) .................... 10-2003-0035951

(51) Int. Cl.
*B01J 23/00* (2006.01)
*B01J 23/10* (2006.01)
*B01J 23/40* (2006.01)
*B01J 23/42* (2006.01)
*B01J 23/44* (2006.01)

(52) U.S. Cl. .................. 502/304; 502/302; 502/303; 502/325; 502/326; 502/339; 423/213.5

(58) Field of Classification Search ................ 502/302, 502/303, 304, 333; 423/213.5
See application file for complete search history.

(56) References Cited

U.S. PATENT DOCUMENTS

| 6,043,188 A | 3/2000 | Yeo |
| 6,294,140 B1* | 9/2001 | Mussmann et al. ........ 423/213.5 |
| 2004/0223897 A1* | 11/2004 | Yeo .................... 423/213.5 |

FOREIGN PATENT DOCUMENTS

| JP | 2001-079404 | | 3/2001 |
| JP | 2001079404 A | * | 3/2001 |
| KR | 00235029 B1 | | 9/1999 |

* cited by examiner

*Primary Examiner*—Roy King
*Assistant Examiner*—Jennifer A Smith
(74) *Attorney, Agent, or Firm*—Morgan Lewis & Bockius LLP

(57) ABSTRACT

The present invention relates to a method of preparing a double layered, palladium-only three-way catalyst using three different composite oxides. More particularly, the present invention relates to a method of preparing a double layered, palladium-only three-way catalyst comprising a first coating layer (bottom layer) and a second coating layer (top layer) containing palladium by incorporating composite oxide, praseodymium oxide, and perovskite.

16 Claims, 1 Drawing Sheet

METHOD OF PREPARING A DOUBLE LAYERED, PALLADIUM-ONLY THREE-WAY CATALYST

CROSS-REFERENCE TO RELATED APPLICATIONS

This application claims priority of Korean Application No. 10-2003-0035951, filed Jun. 4, 2003, the disclosure of which is incorporated herein by reference.

BACKGROUND OF THE INVENTION

1. Field of the Invention

The present invention relates to a method of preparing a double layered, palladium-only three-way catalyst using composite oxides, more particularly to a method of preparing a double layered, palladium-only three-way catalyst comprising a first coating layer (bottom layer) and a second coating layer (top layer) containing palladium by incorporating composite oxide, praseodymium oxide, and perovskite.

2. Description of Related Art

In general, a three-way catalyst refers to a catalyst that facilitates the removal of the noxious components from automobile exhaust gas, such as hydrocarbons, carbon monoxide and nitrogen oxide ($No_x$). Conventional three-way catalysts have included Pt/Rh, Pd/Rh or Pt/Pd/Rh.

These conventional catalysts use rhodium (Rh) to reduce $No_x$ in the exhaust gas, which presents some disadvantages. The use of rhodium is expensive. In addition, rhodium exhibits poor heat resistance.

Moreover, palladium-only three-way catalysts (i.e., single layer coated catalysts) without using rhodium have been reported in Korea Patent Registration Publication No. 235029 and U.S. Pat. No. 6,043,188 entitled "Process for Manufacturing Palladium Ternary Catalyst," which are both incorporated herein by reference in their entireties. The process for preparing such catalysts begins by impregnating a palladium solution with alumina ($Al_2O_3$), which is then reduced. Next, cerium oxide ($CeO_2$) and a mixing solution are added. The pH of the resulting mixture is adjusted and allowed to react. Then, the mixture is milled to obtain a catalyst slurry. Finally, a ceramic monolith is dipped in the prepared catalyst slurry, dried and calcined to produce a palladium-only three-way catalyst.

Recently, regulations on automobile exhaust gas have become more stringent thereby necessitating the use of improved catalysts with superior heat resistance. To meet these requirements, precious metals have been increasingly used as raw materials for catalysts, which has increased costs.

Accordingly, development of a three-way catalyst that can reduce the amount of precious metals to be used, while offering superior removal of $No_x$ and heat resistance, is highly desired.

SUMMARY OF THE INVENTION

Thus, it is an object of the present invention to provide a method of preparing a double layered, palladium-only three-way catalyst using composite oxides and a method of preparing the same, more particularly to a method of preparing a double layered, palladium three-way catalyst comprising a first coating layer (bottom layer) and a second coating layer (top layer) containing palladium by incorporating composite oxide, praseodymium oxide, and perovskite, wherein each comprises cerium-zirconium composite oxide and cerium-zirconium-yttrium composite oxide, in order to improve the nitrogen oxide ($No_x$) removal capability and heat resistance while significantly reducing the amount of palladium to be used.

DETAILED DESCRIPTION OF THE PREFERRED EMBODIMENTS

Figure 1:
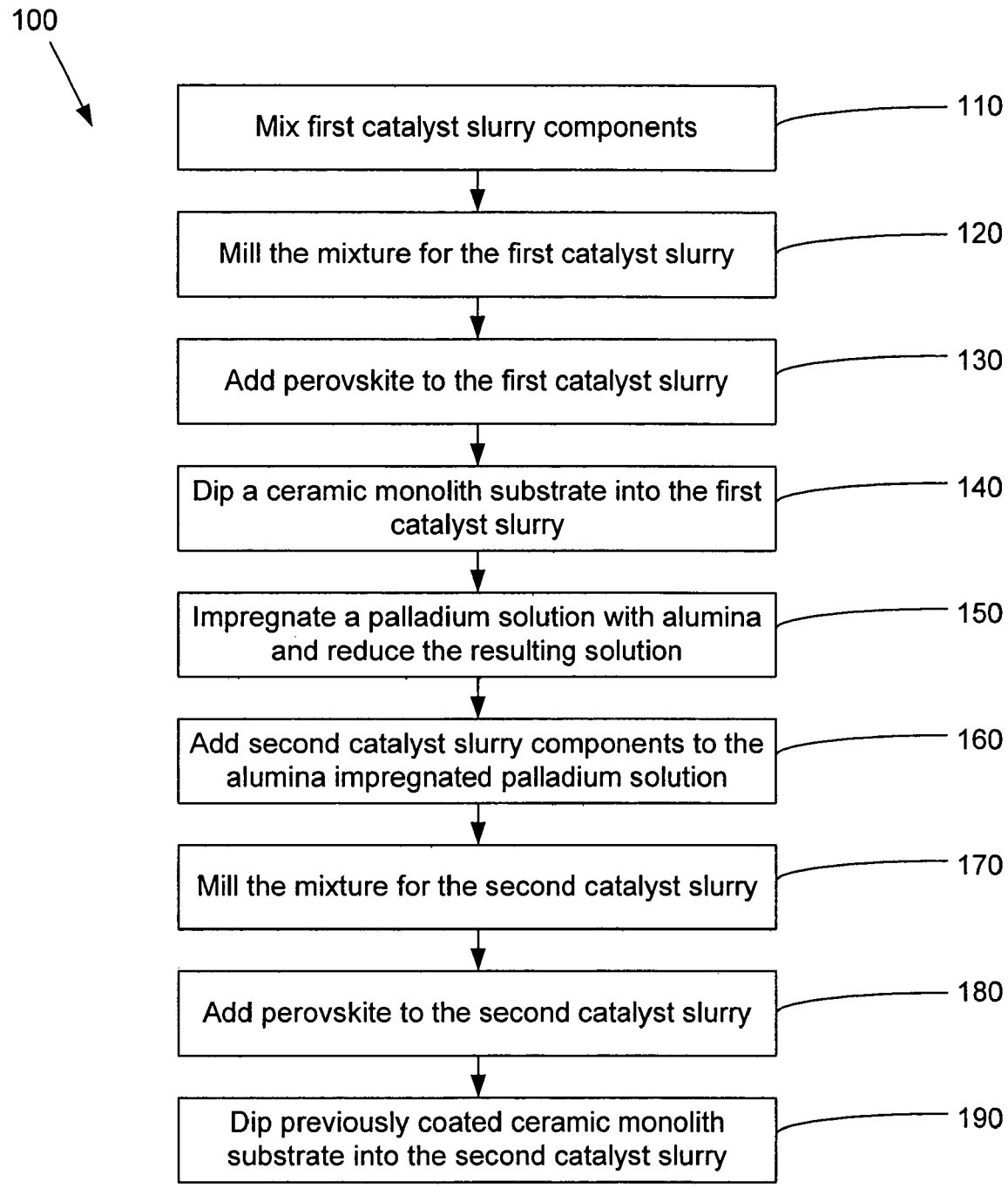
FIG. 1 provides a process flow diagram for the preparation of a three-way catalyst according to one embodiment of the present invention.

Generally, the present invention provides a method of preparing a double layered, palladium-only three-way catalyst that improves nitrogen oxide ($NO_x$) removal and heat resistance, while reducing the amount of expensive palladium to be used. A method of preparing a double layered, palladium-only three-way catalyst according to one embodiment of the present invention comprises the steps of: preparing a first catalyst slurry and a second catalyst slurry using palladium, alumina, cerium oxide and a mixing solution; coating the first catalyst slurry on a ceramic monolith substrate; and coating the second catalyst slurry on the ceramic monolith substrate, which has been dried and calcined after the first coating with the first catalyst slurry.

The first catalyst slurry can be prepared by: adding 15 to 25 g/L of cerium oxide, cerium—zirconium composite oxide [$(Ce.Zr)O_2$] and cerium—zirconium—yttrium composite oxide [$(Ce.Zr.Y)O_2$], proportions thereof ranging from 25:60:15 to 20:60:20 by weight, are added to alumina with respect to the total apparent volume of the substrate; adding 2 to 5 g/L of praseodymium oxide with respect to the total apparent volume of the substrate; reacting to the addition of the mixing solution; and adding 15 to 25 g/L of perovskite selected from $(LaCe)(FeCo)O_3$ and $(LaSr)(FeCo)O_3$ with respect to the total apparent volume of the substrate. Additional details of preparing the first catalyst will be described in connection with FIG. 1.

The second catalyst slurry can be prepared by: reducing alumina that is impregnated in a palladium solution; adding 15 to 25 g/L of cerium oxide, cerium—zirconium composite oxide [$(Ce.Zr)O_2$] and cerium—zirconium—yttrium composite oxide [$(Ce.Zr.Y)O_2$], proportions thereof ranging from 25:60:15 to 20:60:20 by weight, with respect to the total apparent volume of the substrate; adding 2 to 5 g/L of praseodymium oxide with respect to the total apparent volume of the substrate; and adding 15 to 25 g/L of metal oxide (perovskite) selected from $(LaCe)(FeCo)O_3$ and $(LaSr)(FeCo)O_3$ with respect to the total apparent volume of the substrate. Further details on how to prepare the second catalyst will be described in connection with FIG. 1 as well.

In another embodiment of the present invention, only palladium, which exhibits superior heat resistance as well as a superior purifying effect on automobile exhaust gas, especially $NO_x$, is used to prepare a three-way catalyst, in which the ceramic monolith is coated with two layers to form a double layered, palladium-only three-way catalyst. The double layered, palladium-only three-way catalyst can be manufactured by: preparing a first catalyst slurry and a second catalyst slurry; dipping a ceramic monolith substrate in the first catalyst slurry to form a first coating layer; drying and calcining the ceramic monolith substrate; and then dipping it in the second catalyst slurry to form a second coating layer. Further details on how to produce this three-way catalyst will be further described. In this embodiment, the double layered, palladium-only three-way catalyst comprises a first coating layer (bottom layer) not containing palladium and a second coating layer (top layer) containing palladium, so that a ternary composite oxide is used in the first coating layer instead of expensive palladium. The use of palladium only in the second coating layer is an important feature of this embodiment of the present invention.

FIG. 1 provides a process flow diagram for the preparation of a three-way catalyst according to one embodiment of the present invention. In step 110, bulky cerium oxide ($CeO_2$), cerium—zirconium composite oxide [$(Ce.Zr)O_2$] and cerium—zirconium—yttrium composite oxide [$(Ce.Zr.Y)O_2$] are added to alumina ($Al_2O_3$). Then, praseodymium oxide ($PrO_2$) and a mixing solution are added.

Cerium oxide ($CeO_2$), cerium—zirconium composite oxide [$(Ce.Zr)O_2$] and cerium—zirconium—yttrium composite oxide [$(Ce.Zr.Y)O_2$] should be mixed before they are added to alumina, in order to improve heat resistance of the catalyst by forming a more stable structure. Cerium oxide ($CeO_2$), cerium—zirconium composite oxide [$(Ce.Zr)O_2$] and cerium—zirconium—yttrium composite oxide [$(Ce.Zr.Y)O_2$] are mixed in the proportions of which range from 25:60:15 to 20:60:20 by weight. Outside of this range, improvement in heat resistance is insufficient. The mixture of cerium oxide ($CeO_2$), cerium—zirconium composite oxide [$(Ce.Zr)O_2$] and cerium—zirconium—yttrium composite oxide [$(Ce.Zr.Y)O_2$] is added in a range of 15 to 25 g/L with respect to the total apparent volume of the substrate. Outside of this range, heat resistance cannot be much improved.

Praseodymium oxide ($PrO_2$) is added in powdered form in order to effectively remove nitrogen oxides (NOx) by controlling the capability of carbon monoxide (CO) adsorption and oxygen storage through stabilization of cerium (Ce). Praseodymium oxide ($PrO_2$) is added in a range of 2 to 5 g/L with respect to the total apparent volume of the substrate. If the praseodymium oxide content is below 2 g/L, heat resistance and $NO_x$ removal efficiency cannot be much improved. In contrast, if it exceeds 5 g/L, the preparation cost increases.

The mixing solution is prepared by mixing barium oxide, lanthanum oxide, acetic acid and water. Preferably, 2 to 4 g/L barium oxide and 0.5 to 2 g/L lanthanum oxide are added with respect to the total apparent volume of the substrate, to improve heat resistance of alumina and cerium oxide properties.

And, preferably, 10 to 20 g/L acetic acid is added with respect to the total apparent volume of the substrate for pH control. Preferably, the pH is adjusted to 4.5 or less, to obtain a viscosity suitable for a further coating.

In step 120, the mixture obtained from the first step is milled by ball milling, controlling the slurry reaction and particle size, to obtain a particle size of 7 μm or less in more than 90% of the total particles. If the particle size is outside of this range, catalyst activity and durability levels are reduced. After milling, the first catalyst slurry should have a solid content in the range of 30 to 50% and a viscosity range of 200 to 400 cpsi.

In step 130, 15 to 25 g/L of metal oxide (perovskite) selected from $(LaCe)(FeCo)O_3$ and $(LaSr)(FeCo)O_3$ with respect to the total apparent volume of the substrate is added to the catalyst slurry prepared in step 120, so that the nitrogen oxide removal efficiency may be improved. Upon completion of step 130, a first catalyst slurry is obtained.

In step 140, a ceramic monolith substrate is dipped into the first catalyst slurry prepared in steps 110-130 to form a first coating layer which is then dried and calcined. The coating process is performed by double coating through a segregation effect, which maximizes the catalytic effect by positioning the materials at ideal sites. In other words, materials are coated at ideal sites by selecting an ideal addition method and ideal starting materials during coating. The drying is performed in a drying furnace of 150° C. for 2 hours, and the calcining is performed in an electric furnace of 450 to 550° C. for 4 hours. If the drying and calcining temperatures are outside of these ranges, the first coating layer becomes cracked, and noxious compounds may be generated.

In step 150, a palladium (Pd) solution is impregnated with alumina ($Al_2O_3$) and reduced by a thermal fixation method. For example, the thermal fixation is performed at 500° C. for 3 hours.

In step 160, cerium oxide ($CeO_2$), cerium—zirconium composite oxide [$(Ce.Zr)O_2$] and cerium—zirconium—yttrium composite oxide [$(Ce.Zr.Y)O_2$] are added to the alumina impregnated palladium solution, and then praseodymium oxide ($PrO_2$) and a mixing solution are added.

Cerium oxide ($CeO_2$), cerium—zirconium composite oxide [$(Ce.Zr)O_2$] and cerium—zirconium—yttrium composite oxide [$(Ce.Zr.Y)O_2$] should be mixed with one another first, in order to further improve heat resistance of the catalyst by offering a stabilized structure. Cerium oxide ($CeO_2$), cerium—zirconium composite oxide [$(Ce.Zr)O_2$] and cerium—zirconium—yttrium composite oxide [$(Ce.Zr.Y)O_2$] are mixed in proportions of which range from 25:60:15 to 20:60:20 by weight. Outside of this range, improvement in heat resistance is insufficient. The mixture of cerium oxide ($CeO_2$), cerium—zirconium composite oxide [$(Ce.Zr)O_2$] and cerium—zirconium—yttrium composite oxide [$(Ce.Zr.Y)O_2$] are added in a range of 15 to 25 g/L with respect to the total apparent volume of the substrate. Outside of this range, improvement in heat resistance is insufficient.

Praseodymium oxide ($PrO_2$) is added in powdered form in order to control carbon monoxide (CO) adsorption and oxygen storage capacity by stabilizing cerium (Ce) in the catalyst, thereby effectively removing nitrogen oxides (NOx). Praseodymium oxide ($PrO_2$) is added in a range of 2 to 5 g/L with respect to the total apparent volume of the substrate. If the praseodymium oxide content is below 2 g/L, improvement in heat resistance and nitrogen oxide removal is insufficient. In contrast, if the Praseodymium oxide content exceeds 5 g/L, the cost increases.

The mixing solution is prepared by mixing barium oxide, lanthanum oxide, acetic acid and water. Preferably, 2 to 4 g/L of barium oxide and 0.5 to 2 g/L of lanthanum oxide are added with respect to the total apparent volume of the substrate to improve heat resistance of alumina and cerium oxide properties.

Also, preferably 10 to 20 g/L of acetic acid is added with respect to the total apparent volume of the substrate for pH control. Preferably, the pH is adjusted to 4.5 or less to obtain viscosity suitable for a further coating.

In step 170, the mixture prepared in step 160 is milled by ball milling to obtain a particle size of 7 μm or less in more than 90% of the total particles. If the particle size is outside of this range, catalyst activity and durability are reduced. After the milling process, the second catalyst slurry should have a solid content range of 30 to 50% and a viscosity range of 200 to 400 cpsi.

In step 180, 15 to 25 g/L of a metal oxide (perovskite) selected from $(LaCe)(FeCo)O_3$ and $(LaSr)(FeCo)O_3$, with respect to the total apparent volume of the substrate, is added to the catalyst slurry obtained in step 170, in order to improve the $No_x$ removal efficiency. Upon completion of step 180, a second catalyst slurry is obtained.

In step 190, the previously coated ceramic monolith substrate is dipped in the second catalyst slurry prepared in the fifth to eighth steps for a second coating layer, and then dried and calcined. The drying is performed in a drying furnace of 150° C. for 2 hours, and the calcining is performed in an electric furnace of 450 to 550° C. for 4 hours. If the drying and calcining temperatures are outside of these ranges, the second coating layer may crack, and noxious compounds may be generated.

It should be appreciated that the three-way catalyst prepared according to the present invention offers improved nitrogen oxide removal and heat resistance, while significantly reducing the use of expensive palladium. The present invention can be widely used in the manufacture of catalysts that purify exhaust gas emitted by an automobile as well as industrial catalysts.

Hereinafter, the present invention is described in more detail through an Example. However, the following Example illustrates various embodiments of the present invention, and the present invention should not be limited by the following Example.

EXAMPLE

To compare with a conventional palladium-only three-way catalyst, which uses 7.0 g/L of palladium (Pd) with respect to the total apparent volume of the substrate, only 4.0 g/L of palladium (Pd), with respect to the total apparent volume of the substrate, was used to prepare a double layered, palladium-only three-way catalyst.

First, a bulky mixture of 3.125 g of cerium oxide ($CeO_2$), 7.5 g of cerium—zirconium composite oxide [$(Ce.Zr)O_2$] and 1.875 g cerium—zirconium—yttrium composite oxide [$(Ce.Zr.Y)O_2$] were added to 50 g of alumina ($Al_2O_3$), and then 3.0 g of praseodymium oxide ($PrO_2$) was added to prepare the first catalyst slurry.

Then, a mixture solution comprising 2.8 g of barium oxide, 0.67 g of lanthanum oxide, 13.5 g of acetic acid and 187.5 mL of water was added, and the pH was adjusted to 4.2 by using acetic acid.

The slurry was milled to a particle size of 9μ or less by ball milling. Then, after adding 22.5 g/L of $(LaCe)(FeCo)O_3$ [metal oxide (perovskite)] with respect to the total apparent volume of the substrate in powdered form, the slurry was milled to a particle size of 7 μm or less in more than 94% of the total particles to obtain a first catalyst slurry having a solid content of 40% and a viscosity of 300 cpsi.

A ceramic monolith substrate was dipped in the first catalyst slurry for coating, dried in a drying furnace of 150° C. for 2 hours and calcined in an electric furnace of 500° C. for 4 hours.

Next, a solution containing 4.0 g of palladium (Pd) is impregnated with 50 g of alumina ($Al_2O_3$) and reduced by thermal isolation at 500° C. for 3 hours to form the second catalyst slurry.

Then, a bulky mixture of 3.125 g of cerium oxide ($CeO_2$), 7.5 g of cerium—zirconium composite oxide [$(Ce.Zr)O_2$], and 1.875 g of cerium—zirconium—yttrium composite oxide [$(Ce.Zr.Y)O_2$] and 3.0 g of praseodymium oxide ($PrO_2$) were added.

A mixture solution comprising 2.8 g of barium oxide, 0.67 g of lanthanum oxide, 13.5 g of acetic acid and 187.5 mL of water was added, and the pH was adjusted to 4.2 by using acetic acid.

The slurry was milled to a particle size of 9 μm or less by ball milling. Then, after adding 17.5 g/L of $(LaCe)(FeCo)O_3$ [metal oxide (perovskite)] with respect to the total apparent volume of the substrate in powdered form, the slurry was milled to a particle size of 7 μm or less in more than 94% of the total particles to obtain a second catalyst slurry having a solid content of 40% and a viscosity of 300 cpsi.

A first coated ceramic monolith substrate was dipped in the second catalyst slurry for coating, dried in a drying furnace of 150° C. for 2 hours and calcined in an electric furnace of 500° C. for 4 hours to obtain a double layer, palladium-only three-way catalyst.

Comparative Example

To compare with a catalyst of the present invention, which only uses 4.0 g/L of palladium (Pd) with respect to the total apparent volume of the substrate, 7.0 g/L of palladium (Pd) with respect to the total apparent volume of the substrate was used to prepare a single layered palladium-only three-way catalyst by the known method.

First, a solution containing 7.0 g of palladium (Pd) was impregnated with 100 g of alumina ($Al_2O_3$) and reduced by adding 1.66 mL of hydrazine hydrate per 1 g of palladium dropwise.

Then, 30 g of cerium oxide ($CeO_2$) was added. After adding a mixture solution comprising 5.6 g of barium oxide, 1.33 g of lanthanum oxide, 27.3 g of acetic acid and 375 mL of water, the pH was adjusted to 4.2 by using acetic acid.

The mixture was milled to a particle size of 7 μm or less in more than 94% of the total particles by ball milling to obtain a catalyst slurry having a solid content of 40% and a viscosity of 300 cpsi.

A ceramic monolith substrate was dipped in the slurry for coating, dried in a drying furnace of 150° C. for 2 hours and calcined in an electric furnace of 500° C. for 4 hours to obtain a single layered palladium-only three-way catalyst.

Properties of the catalysts prepared in Example and Comparative Example were tested. The result is shown in Table 1.

TABLE 1

| Classification | | Comparative Example (Pd: 7.0 g/L) | Example (Pd: 4.0 g/L) |
|---|---|---|---|
| Low-temperature activation temperature (° C.) | Hydrocarbons | 208 | 202 |
| | CO | 205 | 202 |
| | NOx | 202 | 200 |
| Ternary properties (%) | Hydrocarbons | 99 | 99 |
| | CO | 97 | 95 |
| | NOx | 92 | 95 |
| Low-temperature activation temperature* (° C.) | Hydrocarbons | 279 | 263 |
| | CO | 278 | 265 |
| | NOx | 271 | 261 |
| Ternary properties* (%) | Hydrocarbons | 95 | 96 |
| | CO | 88 | 88 |
| | NOx | 76 | 84 |

*Aging at 950° C.
Ternary property has the average value for λ ranging from 0.97 to 1.01.

In Table 1, the low-temperature activation temperature refers to the temperature at which a 50% purification of hydrocarbons, carbon monoxide and nitrogen oxides is obtained. The lower the temperature, the better the purification. The ternary properties refer to the removal capability of the aforementioned three components. The higher the value, the better the removal capability. Aging was performed in an electric furnace of 950° C. for 140 hours.

As seen in Table 1, the three-way catalyst of the present invention, which was prepared according to the Example, showed better purification and removal efficiency of hydrocarbons, carbon monoxide and nitrogen oxides than that of the Comparative Example, in spite of the significantly reduced palladium content.

The double layered, three-way catalyst prepared by the present invention has improved nitrogen oxide removal and heat resistance, while using a significantly decreased amount of palladium.

As described above, the present invention provides a double layered, palladium-only three-way catalyst comprising a first coating layer (bottom layer) not containing palladium and a second coating layer (top layer) containing palladium by inserting ternary composite oxide between the first and second coating layers to offer improved nitrogen oxide removal and heat resistance with significantly reduced palladium content. Therefore, the present invention can be widely used for catalysts as automobile exhaust gas purification and industrial catalysts.

While the present invention has been described in detail with respect to the preferred embodiments, those skilled in the art will appreciate that various modifications and substitutions can be made thereto without departing from the spirit and scope of the present invention as set forth in the appended claims.

What is claimed is:

1. A method of preparing a double layered, palladium-only three-way catalyst comprising the steps of:
   preparing a first catalyst slurry and a second catalyst slurry using palladium, alumina, cerium oxide and a mixing solution;
   first coating of the first catalyst slurry on a ceramic monolith substrate;
   drying the substrate;
   calcining the substrate; and
   second coating of the second catalyst slurry:
   wherein said first catalyst slurry is prepared by adding 15 to 25 g/L of a mixture of cerium oxide, cerium—zirconium composite oxide [$(Ce.Zr)O_2$] and cerium—zirconium—yttrium composite oxide [$(Ce.Zr.Y)O_2$], proportions of which ranging from 25:60:15 to 20:60:20 by weight, with respect to the total apparent volume of the substrate to alumina; adding 2 to 5 g/L of praseodymium oxide with respect to the total apparent volume of the substrate; and adding 15 to 25 g/L of metal oxide (perovskite) selected from $(LaCe)(FeCo)O_3$ and $(LaSr)(FeCo)O_3$ with respect to the total apparent volume of the substrate.

2. The method of claim 1, wherein said second catalyst slurry is prepared by reducing a palladium solution impregnated with alumina, adding 15 to 25 g/L of a mixture of cerium oxide, cerium—zirconium composite oxide [$(Ce.Zr)O_2$] and cerium—zirconium—yttrium composite oxide [$(Ce.Zr.Y)O_2$], proportions of which ranging from 25:60:15 to 20:60:20 by weight, with respect to the total apparent volume of the substrate, adding 2 to 5 g/L of praseodymium oxide with respect to the total apparent volume of the substrate and adding 15 to 25 g/L of metal oxide (perovskite) selected from $(LaCe)(FeCo)O_3$ and $(LaSr)(FeCo)O_3$ with respect to the total apparent volume of the substrate.

3. The method of claim 1, wherein said mixing solution comprises barium oxide, lanthanum oxide, acetic acid, and water.

4. The method of claim 1 further comprises milling said first catalyst slurry before said first coating.

5. The method of claim 1 further comprises milling said second catalyst slurry before said second coating.

6. The method of claim 1, wherein said drying is performed at 150° C. for two hours.

7. The method of claim 1, wherein said calcining is performed at 150° C. for four hours.

8. A method of reducing automobile exhaust emission components comprises using a double layered, palladium-only three-way catalyst having a substrate, a bottom layer with a ternary composite oxide disposed over said substrate, and a top layer with palladium disposed over said bottom layer.

9. The method of claim 8, wherein said bottom layer of said double layered, palladium-only three-way catalyst comprises a first catalyst slurry that is prepared by adding 15 to 25 g/L of a mixture of cerium oxide, cerium—zirconium composite oxide [$(Ce.Zr)O_2$] and cerium—zirconium—yttrium composite oxide [$(Ce.Zr.Y)O_2$], proportions of which ranging from 25:60:15 to 20:60:20 by weight, with respect to the total apparent volume of the substrate to alumina; adding 2 to 5 g/L of praseodymium oxide with respect to the total apparent volume of the substrate; and adding 15 to 25 g/L of metal oxide (perovskite) selected from $(LaCe)(FeCo)O_3$ and $(LaSr)(FeCo)O_3$ with respect to the total apparent volume of the substrate.

10. The method of claim 9, wherein said first catalyst slurry is milled.

11. The method of claim 10 further comprises first catalyst slurry being coated onto said substrate, thereby forming said bottom layer.

12. The method of claim 11 further comprises drying and calcining said substrate.

13. The method of claim 12, wherein said top layer of said double layered, palladium-only three-way catalyst comprises a second catalyst slurry that is prepared by reducing a palladium solution impregnated with alumina, adding 15 to 25 g/L of a mixture of cerium oxide, cerium—zirconium composite oxide [$(Ce.Zr)O_2$] and cerium—zirconium—yttrium composite oxide [$(Ce.Zr.Y)O_2$], proportions of which ranging from 25:60:15 to 20:60:20 by weight, with respect to the total apparent volume of the substrate, adding 2 to 5 g/L of praseodymium oxide with respect to the total apparent volume of the substrate and adding 15 to 25 g/L of metal oxide (perovskite) selected from $(LaCe)(FeCo)O_3$ and $(LaSr)(FeCo)O_3$ with respect to the total apparent volume of the substrate.

14. The method of claim 13, wherein said second catalyst slurry is milled.

15. The method of claim 14 further comprises said second catalyst slurry being coated onto said substrate and above said bottom layer, thereby forming said top layer.

16. The method of claim 15 further comprises drying and calcining said substrate.

* * * * *